Feb. 21, 1933. C. V. GRUTSCH 1,898,442
FISHHOOK
Filed April 23, 1932
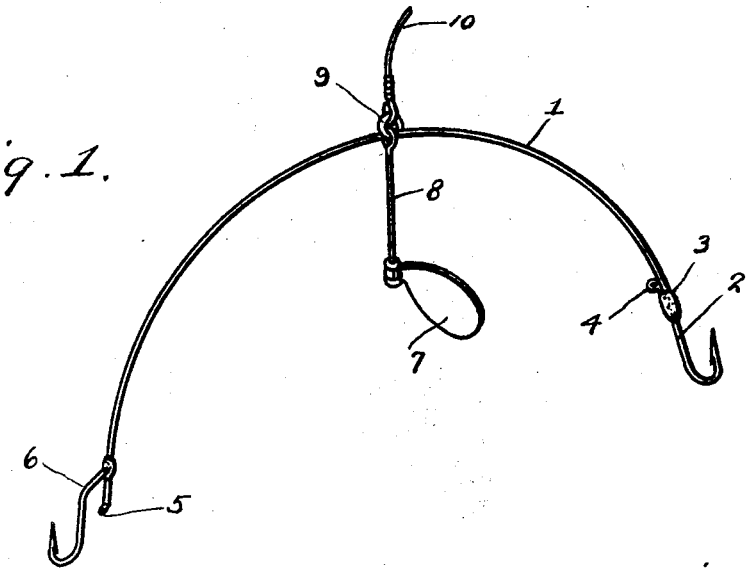
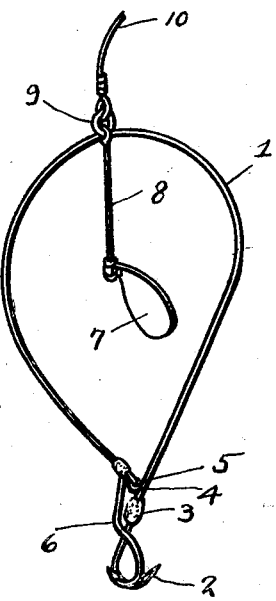
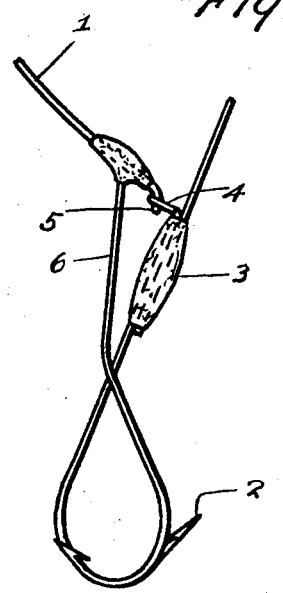
Inventor
Carl V. Grutsch Patented Feb. 21, 1933

1,898,442

UNITED STATES PATENT OFFICE

CARL V. GRUTSCH, OF SAGINAW, MICHIGAN

FISHHOOK

Application filed April 23, 1932. Serial No. 607,192.

This invention relates to improvements in fishhooks, the general object of the invention being to provide a spring member having a hook at each end thereof with latch means for holding the member in a looped position with the hooks overlapping each other so that when a fish takes the hooks in its mouth, the latch means is released and the spring member causes the two hooks to engage both sides of the mouth of the fish and thus render it impossible for the fish to release itself from the hooks.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a view of the device in open position.

Fig. 2 is a view of the device in closed position.

Fig. 3 is an enlarged view of the lower part of Fig. 2 to more clearly show the latch means.

As shown in these views, the device comprises a member 1 formed of spring wire and of bowed shape with a fishhook 2 connected to one end thereof by solder or the like as shown at 3. A keeper member 4 is also located at this end of the member 1 and if desired, this keeper member can be formed by the eye of the hook 2 by bending it at right angles as shown in Fig. 3.

The other end of the member is bent into substantially hook shape as shown at 5 for engaging the keeper member 4 so as to hold the member in looped shape as shown in Fig. 2. This end of the member 1 also carries a fishhook 6 which is preferably bent as shown in Figs. 2 and 3 so that this hook can overlap the other hook when the member 1 is in looped shape as shown in Figs. 2 and 3.

As shown in the drawing, the hooks have their hooked portions extending outwardly so that when they are overlapped, the points will extend in opposite directions as clearly shown in Fig. 3.

The fish bites on the hook 2, which will slightly straighten the wire member 1 which then will cause keeper member 4 to pull down away from the hook 5, thereby releasing the hook 5 from keeper member 4 which causes wire 1 to spring with hook 6 which sets hook 6 in that side of the fish's mouth, opposite the side engaged by hook 2.

If desired, a bait can be placed on the hooks or the hooks can be formed with flies or other articles or lures though Figs. 1 and 2 show a spinner 7 attached to a rod 8 which is connected to the center of the member 1. An eye 9 is formed at the center of the member so that the line 10 can be fastened thereto.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A device of the class described comprising a wire of spring material and having a fishhook rigidly connected to each end thereof with the hook portion extending outwardly, a keeper member adjacent one end of the spring member, the other end of the member being bent into hook shape to engage the keeper member whereby when a fish seizes the hooks the bent end of the member will be forced out of the keeper member to permit the spring member to spread and thus cause the hooks to engage both sides of the fish's mouth.

In testimony whereof I affix my signature.

CARL V. GRUTSCH.